United States Patent

[11] 3,556,465

[72] Inventor Robert K. Little
 Mount Holly, N.J.
[21] Appl. No. 831,650
[22] Filed June 9, 1969
[45] Patented Jan. 19, 1971
[73] Assignee RKL Controls, Inc.
 Hainesport, N.J.
 a corporation of New Jersey

[54] DIAPHRAGM VALVE ASSEMBLY AND METHOD OF MAKING SAME
 9 Claims, 8 Drawing Figs.

[52] U.S. Cl............................................. 251/61.1,
 251/147; 92/91, 92/92
[51] Int. Cl............................................. F16k 7/17
[50] Field of Search.................................. 251/61.1,
 331, 147; 138/93; 137/220, 219; 92/91, 92

[56] References Cited
 UNITED STATES PATENTS
 2,838,269 6/1958 Hunter et al................. 251/61.1
 3,432,139 3/1969 Jentoft....................... 251/61.1
 FOREIGN PATENTS
 914,146 12/1962 Great Britain............... 137/219

Primary Examiner—M. Cary Nelson
Assistant Examiner—R. B. Rothman
Attorney—Howson and Howson ABSTRACT: A diaphragm valve having an annular valve seat and a spaced opposed valve assembly comprising a fabric-reinforced elastic diaphragm capsule molded around a metal supporting disc. Low pressure fluid is selectively introduced within the elastic capsule to resiliently expand the capsule toward the valve seat. The elastic capsule is reinforced around the circumference of the disc edge by a layer of tire cord fabric which permits a hemispherical expansion of the capsule without permitting a destructive stretching of the capsule in this region.

PATENTED JAN 19 1971
3,556,465
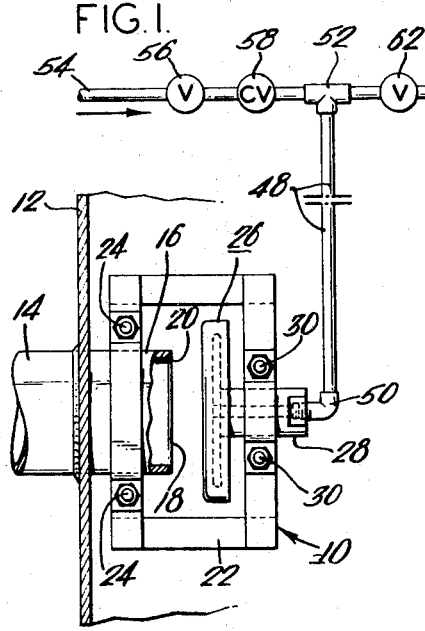
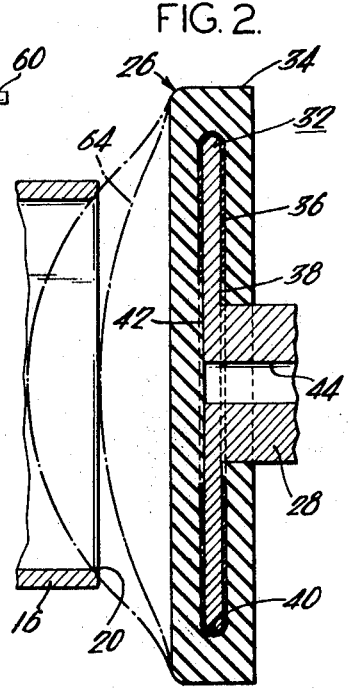
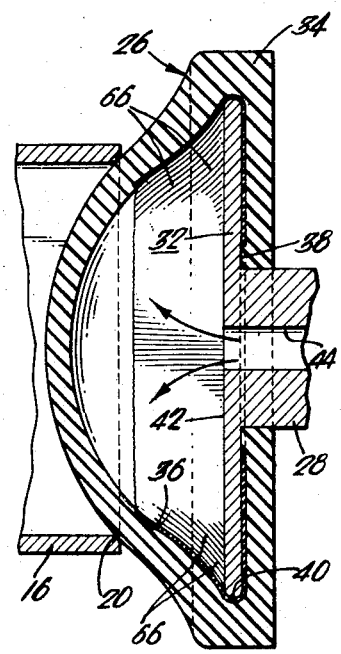
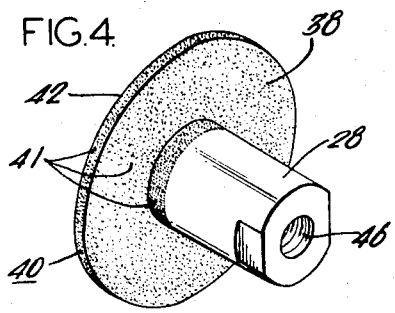
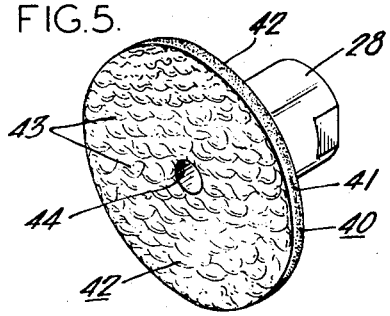
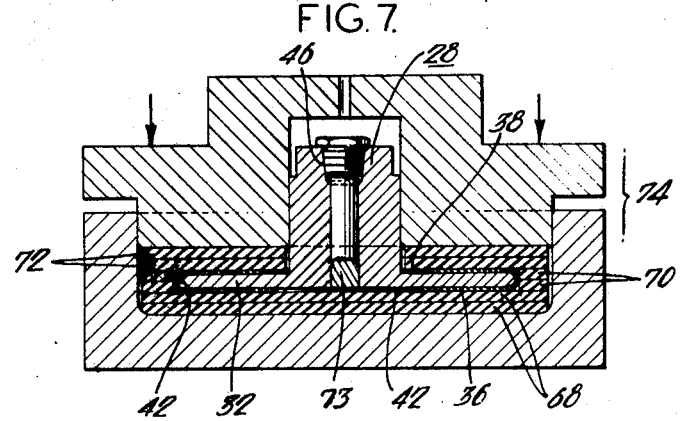
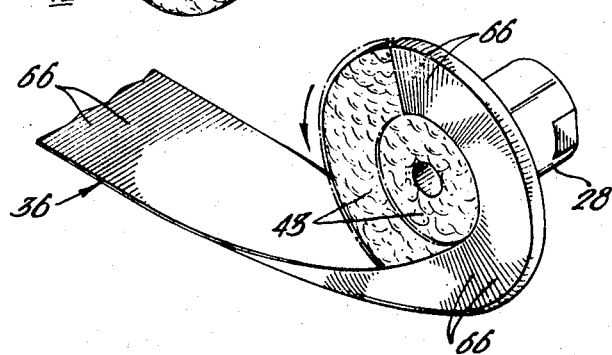
INVENTOR:
ROBERT K. LITTLE
BY
Howson & Howson
ATTYS.

DIAPHRAGM VALVE ASSEMBLY AND METHOD OF MAKING SAME

The method of producing the described valve assembly comprises the steps of covering one side of the disc with a bonding cement, covering the opposite side of the disc with a parting agent, placing tire cord fabric circumferentially around the edge of the disc with the primary fabric cords perpendicular to the disc edge and overlapping a portion of each disc face, placing an elastomer over the faces and around the edge of the disc, and applying heat and pressure to mold the elastomer and fabric into a capsule which is expandable away from the disc surface bearing the parting agent upon application of fluid pressure to said surface.

The present invention relates generally to low pressure fluid actuated valves and relates more particularly to a diaphragm valve having a low cost disposable valve assembly of a novel construction and to a method of making said valve assembly.

Fluid actuated valves of the type comprising resilient valve elements have a number of advantages over the more conventional valve types. The absence of moving parts other than the resilient valve member results in a very simple valve structure which can be inexpensively manufactured. The simplicity of the valve is advantageous for many applications, for example wherein the valve must be thoroughly cleansed after use such as in the food industry. The valve illustrated in the present application may be quickly disassembled for cleaning, inspection or replacement.

The present diaphragm valve is characterized by an annular valve seat in spaced opposed relation to which is mounted the novel valve assembly. The valve assembly includes a disc-shaped metal supporting plate over which is molded a diaphragm capsule of elastomeric material such as rubber. A reinforcement of tire cord fabric is molded within the capsule extending circumferentially around the disc with the primary fabric cords thereof extending perpendicularly to the disc edge. Means are provided to introduce a fluid under pressure within the capsule to thereby expand the side thereof facing the valve orifice from its relaxed flat condition to a semispherical shape to control the flow through the valve orifice. A partial expansion of the diaphragm capsule will provide a selectively variable throttling through the orifice. By means of suitable controls on the fluid pressure source, the valve position may be selectively adjusted at any position from full open to the full closed position.

The method of making the valve assembly in brief comprises the coating of one side of the disc-shaped supporting plate with a bonding cement, coating the opposite side with a parting agent such as silicone grease, stretching tire cord fabric skimmed with uncured rubber around the circumference of the plate so that it lies flat along both sides of the plate edge with the primary fabric cords perpendicular to the plate edge, placing layers of uncured rubber or other elastomer over the edge and faces of the plate and applying heat and pressure thereto to mold the rubber layers and fabric into a capsule. The encapsulating elastomer bonds to the tire cord fabric and to the side of the plate to which the cement was applied. The parting agent, however, prevents bonding to the front side of the plate, thus permitting the expansion of the elastomer upon application of fluid pressure into a partial hemispherical shape, the tire cord fabric reinforcing the elastomer around the plate edges.

It is accordingly a primary object of the present invention to provide a diaphragm valve characterized by a novel low cost disposable valve assembly.

Another object of the invention is to provide a diaphragm valve as described having a novel fabric-reinforced elastomeric diaphragm capsule.

It is a further object of the present invention to provide a novel method of making the described valve assembly.

Additional objects and advantages of the invention will be more readily apparent from the following detailed description of an embodiment thereof when taken together with the accompanying drawings in which:

FIG. 1 is a side elevational view of a diaphragm valve in accordance with the present invention installed within a tank to regulate liquid flow therefrom, showing the valve in the open position;

FIG. 2 is an enlarged partial sectional view taken axially through the valve, showing the valve assembly and valve seat, and indicating in broken lines and intermediate throttling valve position and a closed valve position;

FIG. 3 is a view similar to FIG. 2 showing the valve in the closed position;

FIG. 4 is a rear perspective view of the diaphragm capsule plate and support member showing the plate coated with adhesive prior to the molding of the diaphragm capsule therearound;

FIG. 5 is a front perspective view of the plate and support member, showing the front face of the plate coated with a parting agent prior to the molding operation;

FIG. 6 is a perspective view similar to FIG. 5 showing the manner in which the tire cord fabric is applied circumferentially around the edge of the plate;

FIG. 7 is a sectional view taken vertically through the center of a mold during the molding of the diaphragm capsule onto the plate; and FIG. 8 is a perspective view showing the completed valve assembly.

Referring to the drawings, FIG. 1 shows a diaphragm valve generally designated 10 in accordance with the present invention which is mounted below the liquid level within a tank 12 to control flow from the tank through the outlet conduit 14 extending through a sidewall thereof. The valve may of course have many other applications, the present arrangement being selected only as an example of the uses for which the valve is suited.

The portion 16 of the conduit extending into the tank fluid chamber terminates at 18, the conduit end forming an annular valve seat 20 which has an inward radius as shown in FIGS. 2 and 3. As will presently become apparent the conduit end establishes the valve orifice through which flow is controlled by the resilient capsule.

A bracket 22 is clamped to the end 16 of the conduit by bolts 24 and serves to support the valve assembly 26 in spaced relation opposite the valve seat 20. The bracket is secured to the support member 28 of the valve assembly by bolts 30. The configuration of the bracket 22 is not of importance to the invention and it will be obvious that any type of support means suitable for disposing the valve assembly in position in spaced opposition to the valve seat may be employed. For example, the bracket may extend from the wall of the tank or vessel itself, and the valve seat may be flush with the vessel wall.

The support member 28, which in the present example is of a cylindrical configuration, is disposed in a coaxial relationship with the annular valve seat 20 and on its end opposed from the valve seat includes a disc-shaped capsule supporting plate extending parallel to the annular valve seat diameter. In the present example, the plate 32 is shown as integral with the support member 28 although it is obvious that the valve support may be a separate element attached to the plate by welding, threading or any other suitable mode of attachment.

As shown most clearly in FIGS. 2 and 3, the valve assembly includes a resilient capsule 34 which is molded over the plate 32. A fabric reinforcement 36 of tire cord fabric or a similar material is provided circumferentially around the plate edge and is molded into the capsule. The primary fabric cords or threads of the fabric 36 are disposed perpendicularly to the edge of the plate. The capsule and fabric reinforcement are adhesively bonded to the rear face 38 of the plate 32 as well as the edge 40 thereof but are free of the front face 42 of the plate.

A coaxial bore 44 in the support member 28 opens through the front face 42 of the plate 32 and at its opposite end terminates in the threaded port 46. Conduit 48 is connected with the bore 44 by means of the threaded fitting 50 which is threadedly engaged with the port 46. The conduit 48 connects with the tee fitting 52 into which a pressurized fluid may be introduced through conduit 54 by means of valve 56 from a fluid source (not shown). A check valve 58 is provided between the valve 56 and the fitting 52. Also connected with the fitting 52 is the discharge conduit 60 having a valve 62 therein to permit selective control of the fluid discharge.

In operation, with the valve 62 closed, the valve 56 is opened to permit a pressurized fluid to pass through the conduit 48 and bore 44 whereupon the resilient capsule 34 is expanded into the hemispherical shape such as shown in FIG. 3 toward the valve seat 20. The expansion of the capsule can be utilized to close the valve orifice as shown in FIG. 3 or to throttle flow therethrough if restricted to an intermediate position such as that illustrated in broken lines at 64 in FIG. 2. The position of the expanded capsule may be varied as desired to produce the desired valve opening by manipulation of the valves 56 and 62. To completely open the valve, the valve 62 is opened to exhaust the pressure fluid from within the capsule. The resilient nature of the capsule will then cause a return of the capsule to the flat condition shown in FIG. 2 against the front face 42 of the plate 32, thereby allowing full flow through the valve orifice. To assure an immediate return of the capsule to a fully open position, especially if the elastomer has taken a set after being in the closed position for a period of time, it may be desirable to draw a vacuum on the discharge conduit 60.

The valve actuating fluid may be either a gas or a liquid with compressed air being a preferred fluid in view of its availability and the permissible venting to atmosphere. The actuating pressure required is relatively low and in view of the deformable nature of the capsule, the valve is normally restricted to low pressure applications.

The novel method of making the valve assembly is illustrated in FIGS. 4—7, FIG. 4 illustrating one step of the method which comprises the coating of the back face 38 and edge 40 of the plate 32 with a suitable metal to elastomer adhesive 41. Utilizing a cold rolled steel plate and a pure gum rubber elastomer, a suitable adhesive is "Chemloc No. 231" manufactured by the Lord Corporation, Erie, Pa. The adhesive is also extended partway along the surface of the support member 28 adjacent the plate. The front face 42 of the plate 32 is coated with a suitable parting agent 43 such as silicone grease to prevent adhering of the capsule to the front face during the molding operation.

Following the application of the adhesive and parting agent to the plate, the tire cord fabric reinforcement 36 is applied circumferentially to the plate edge 40 with the primary fabric cords or threads 66 thereof lying perpendicular to the plate edge 40. Since the tire cord fabric is skimmed with uncured rubber on both sides, it is quite elastic in a direction perpendicular to the cords 66 while being virtually inelastic in the direction parallel with the cords. As a result, it is possible by stretching the fabric as it is applied to the disc edge to produce a wrinkle-free application of the fabric to the plate with a substantial overlap along both the front and rear plate surfaces. The fabric will lie flat around the entire circumference of the plate against both the front and rear plate surfaces. While the fabric could be wrapped in several layers around the plate edge, for normal purposes a single application of fabric with a slight overlap provides an adequate reinforcement of the capsule.

Following the application of the fabric to the disc, layers of the elastomeric material from which the capsule is formed are placed adjacent the front and rear plate surfaces as well as the plate edge and the assembly is placed in a mold for the application of heat and pressure to cure the elastomeric layers. As shown in FIG. 7, circular layers 68 of the elastomer are placed adjacent the front face 42 of the plate, ring-shaped elastomer layers 70 are placed adjacent the edge 40 of the plate proximate the fabric layer, and ring-shaped layers 72 of elastomer are positioned adjacent the rear face 38 of the plate. A plug 73 is threadedly secured in the bore 44 flush with face 42 to prevent any extrusion of elastomer into the bore. This assembly is placed in a mold 74 schematically illustrated in FIG. 7 and heat and pressure are applied for the requisite length of time to cure the elastomer and effect a molding of the elastomeric layers 68, 70 and 72 with the fabric layer 36 into a unitary capsule 34. Following the molding operation, the valve assembly has the appearance illustrated in FIG. 8.

A variety of elastomers may be utilized in fabricating the resilient capsule. Examples of elastomers which have proved satisfactory for this purpose are pure gum rubber, neoprene, Nypalon, Viton, Buna-n Butyl, and polyurethane.

Although the preferred fabric reinforcement as indicated above is tire cord fabric, other materials exhibiting a similar differential stretch characteristic might suitably be used. A loosely woven fabric known in the trade as "breaker cloth" which is stretchable primarily in one direction could for example be suitably substituted for the tire cord fabric of the illustrated embodiment.

Although the fabric reinforcement has been illustrated as applied directly against the supporting plate, it is also possible to place the fabric between layers of elastomer in such a fashion that the fabric engages only the rear face 38 of the plate or is spaced from the plate at all points by the elastomer.

Although the relative dimensions of the valve orifice and the valve assembly are not critical, for best results it is preferred that the diameter of the capsule be approximately 1⅔ times the diameter of the valve orifice. With this relationship, the valve assembly in the open position should be spaced a distance from the valve seat equal to one-quarter of the valve orifice diameter. These relationships permit a hemispherical ballooning of the capsule as illustrated in FIG. 3 and permit a gastight seating of the capsule against the valve seat.

Although the illustrated embodiment was described as adapted for controlling fluid flow from a tank, it should be pointed out that the valve may be used to control flow in either direction through the valve. With the valve assembly spaced a distance from the valve seat equal to one-quarter of the valve orifice diameter, full flow is permitted through the orifice in either direction when the valve is fully opened.

The provision of the fabric reinforcement overlying both sides of the capsule support plate provides the necessary internal tangential strength to the capsule during the hemispherical ballooning such as shown in FIG. 3. Since the greatest stresses occur in this region, the fabric is necessary to prevent failure of the capsule in the region adjacent the plate edge.

The valve seat and the capsule supporting plate have respectively been illustrated and described as annular and disc-shaped. Although these are the preferred configurations, it will be apparent that other configurations could be employed. For example, both the valve seat and the supporting plate could have an elliptical shape. Similarly, the valve seat could be annular with a square supporting plate, provided a sufficient spacing were allowed between the valve seat and the plate, and the plate were of a sufficient size. In the latter example, the capsule would have a hemispherical shape in the region engaging the valve seat.

The simplicity and low cost of the valve assembly permit the ready replacement of the entire assembly should the capsule become damaged in any way. In view of the low cost of the assembly, extra assemblies can be kept on hand and replacement made when required in a very short time.

Similarly, the simplicity of the present diaphragm valve permits outright removal of the valve assembly such as for cleaning. The smooth surface of the valve assembly and the complete absence of crevices within which foreign matter may become lodged make the valve especially attractive for use in applications where cleanliness is essential such as the food industry.

Manifestly, changes in details of construction can be effected by those skilled in the art without departing from the spirit and the scope of the invention as defined in and limited solely by the appended claims.

I claim:

1. A diaphragm valve comprising means defining a valve seat, a valve assembly opposed from said valve seat, said valve assembly comprising a plate disposed in parallel spaced relation to said valve seat, said plate having a front face facing said valve seat and a rear face directed away therefrom, an elastomeric capsule molded around said plate, a fabric reinforcement molded within said capsule, said fabric reinforcement extending around the circumference of said plate in overlying relation with portions of each of said plate faces, said capsule being adhesively bonded to the rear face of said plate, and means permitting passage of a pressure fluid to the front face of the plate to resiliently expand the capsule toward said valve seat.

2. A valve as claimed in claim 1 wherein said fabric is stretchable predominantly in one direction, said fabric being disposed in said capsule with the predominant direction of stretch running circumferentially around said plate.

3. A valve as claimed in claim 2 wherein said fabric comprises tire cord skimmed with uncured rubber.

4. A valve as claimed in claim 1, said valve seat having an annular configuration, and said plate being disc-shaped.

5. A valve as claimed in claim 1 including means for selectively controlling the flow of pressure fluid to and from said capsule to selectively control the position of said capsule.

6. A valve assembly for a diaphragm valve comprising a plate having front and rear faces, and elastomeric capsule molded around said plate, a fabric reinforcement molded within said capsule, said fabric reinforcement extending around the circumference of said plate in overlying relation with portions of each of said plate surfaces, said capsule being adhesively bonded to the rear face of said plate, and means permitting passage of a pressure fluid to the front face of said plate to resiliently expand the capsule portion adjacent said face into a hemispherical shape.

7. A valve as claimed in claim 6, wherein said plate is disc-shaped.

8. A valve as claimed in claim 6 wherein said fabric is stretchable predominantly in one direction, said fabric being disposed in said capsule with the predominant direction of stretch running circumferentially around said plate.

9. A valve as claimed in claim 8 wherein said fabric comprises tire cord skimmed with uncured rubber.